US010725820B2

(12) United States Patent
Bai

(10) Patent No.: US 10,725,820 B2
(45) Date of Patent: Jul. 28, 2020

(54) APPLICATION CONTROL METHOD AND MOBILE TERMINAL

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 185 days.

(21) Appl. No.: 15/985,935

(22) Filed: May 22, 2018

(65) Prior Publication Data

US 2018/0341522 A1    Nov. 29, 2018

(30) Foreign Application Priority Data

May 26, 2017   (CN) .......................... 2017 1 0384636

(51) Int. Cl.
*G06F 9/46*          (2006.01)
*G06F 9/48*          (2006.01)
(Continued)

(52) U.S. Cl.
CPC ............ *G06F 9/4881* (2013.01); *G06F 9/485* (2013.01); *G06F 11/3433* (2013.01);
(Continued)

(58) Field of Classification Search
CPC .... G06F 9/4881; G06F 9/485; G06F 11/3433; G06F 21/121; G06F 21/32; G06K 9/00281
See application file for complete search history.

(56) References Cited

U.S. PATENT DOCUMENTS

2006/0136916 A1* 6/2006 Rowland ................ G06F 9/485
                                                            718/100
2009/0007257 A1* 1/2009 Hirata ..................... G06F 21/32
                                                            726/19
(Continued)

FOREIGN PATENT DOCUMENTS

CN       102510422 A    6/2012
CN       103500002 A    1/2014
(Continued)

OTHER PUBLICATIONS

Extended European search report issued in corresponding European application No. 18171841.2 dated Sep. 27, 2018.
(Continued)

*Primary Examiner* — Camquy Truong
(74) *Attorney, Agent, or Firm* — Young Basile Hanlon & MacFarlane, P.C.

(57) ABSTRACT

An application control method and a mobile terminal are provided. The method is applicable to a mobile terminal including a processor and an artificial intelligence (AI) module. Whether a current user is a registered user is detected by the processor when detecting that an application running on the mobile terminal belongs to a preset application set. A monitoring instruction carrying an identification of the running application is sent to the AI module by the processor when detecting that the current user is the registered user. A monitoring strategy of the running application associated with the registered user is acquired by the AI module, where the monitoring strategy includes a monitoring parameter and a corresponding monitoring parameter threshold. The running application is closed by the AI module when detecting that a value of the monitoring parameter of the running application is greater than or equal to the monitoring parameter threshold.

17 Claims, 5 Drawing Sheets

(51) Int. Cl.
  *G06F 21/32* (2013.01)
  *H04L 29/08* (2006.01)
  *G06F 21/12* (2013.01)
  *G06F 11/34* (2006.01)
  *G06K 9/00* (2006.01)
  *H04M 1/725* (2006.01)
  *H04W 12/00* (2009.01)

(52) U.S. Cl.
  CPC ............ *G06F 21/121* (2013.01); *G06F 21/32* (2013.01); *G06K 9/00281* (2013.01); *H04L 67/306* (2013.01); *G06F 2221/2137* (2013.01); *G06F 2221/2149* (2013.01); *H04M 1/72563* (2013.01); *H04W 12/00502* (2019.01)

(56) References Cited

U.S. PATENT DOCUMENTS

| | | |
|---|---|---|
| 2009/0249462 A1 | 10/2009 | Chhabra |
| 2013/0047229 A1 | 2/2013 | Hoefel et al. |
| 2014/0208397 A1 | 7/2014 | Peterson |
| 2015/0180865 A1* | 6/2015 | Wong ..................... G06F 21/32 726/4 |
| 2016/0248810 A1 | 8/2016 | Majaniemi |

FOREIGN PATENT DOCUMENTS

| | | |
|---|---|---|
| CN | 104008628 A | 8/2014 |
| CN | 104484588 A | 4/2015 |
| CN | 105183139 A | 12/2015 |
| CN | 106055100 A | 10/2016 |
| CN | 106484594 A | 3/2017 |
| CN | 106502859 A | 3/2017 |
| CN | 106503501 A | 3/2017 |
| WO | 2010103110 A2 | 9/2010 |
| WO | 2015184885 A1 | 12/2015 |

OTHER PUBLICATIONS

International search report issued in corresponding international application No. PCT/CN2018/085716 dated Jul. 25, 2018.
Examination Report No. 1 issued in corresponding AU application No. 2018274373 dated May 31, 2020.

* cited by examiner

APPLICATION CONTROL METHOD AND MOBILE TERMINAL

CROSS-REFERENCE TO RELATED APPLICATION(S)

This application claims priority to Chinese Patent Application No. 201710384636.4, filed on May 26, 2017, the disclosure of which is hereby incorporated by reference in its entirety.

TECHNICAL FIELD

The present disclosure relates to the field of mobile terminal technology, and particularly to an application control method and a mobile terminal.

BACKGROUND

With the rapid development of smart phones, various applications, such as video applications, game applications, payment applications and the like, are installed in the smart phone to realize related functions.

At present, after an application of the smart phone is enabled by a user, the application runs on the smart phone all the time based on continuous operations of the user. Taking a game application as an example, when the user uses the game application for a long time, unless the smart phone experiences stuck or reboot or other anomalies, the game application will run on the smart phone all the time during usage of the user.

SUMMARY

Implementations of the disclosure provide an application control method and related products to improve intelligence and security of application control of a mobile terminal.

According to a first aspect of the disclosure, there is provided a mobile terminal. The mobile terminal includes a processor and an artificial intelligence (AI) module coupled with the AI module.

The processor is configured to detect whether a current user is a registered user when detecting that an application running on the mobile terminal (hereinafter, "running application" for short) belongs to a preset application set.

The processor is further configured to send a monitoring instruction carrying an identification of the running application to the AI module when detecting that the current user is the registered user.

The AI module is configured to acquire a monitoring strategy of the running application which is associated with the registered user, where the monitoring strategy includes a monitoring parameter and a corresponding monitoring parameter threshold.

The AI module is further configured to close the running application when detecting that a value of the monitoring parameter of the running application is greater than or equal to the monitoring parameter threshold.

According to a second aspect of the disclosure, there is provided an application control method. The method is applicable to a mobile terminal including a processor and an artificial intelligence (AI) module. The method includes the following operations.

Whether a current user is a registered user is detected by the processor when detecting that an application running on the mobile terminal (hereinafter, "running application" for short) belongs to a preset application set.

A monitoring instruction carrying an identification of the running application is sent to the AI module by the processor when detecting that the current user is the registered user.

A monitoring strategy of the running application associated with the registered user is acquired by the AI module, where the monitoring strategy includes a monitoring parameter and a corresponding monitoring parameter threshold.

The running application is closed by the AI module when detecting that a value of the monitoring parameter of the running application is greater than or equal to the monitoring parameter threshold.

According to a third aspect of the disclosure, there is provided a mobile terminal. The mobile terminal has functions for implementing operations of the mobile terminal in the above method. The functions can be implemented by hardware or by executing corresponding software with the hardware. The above-mentioned hardware or software includes one or more modules corresponding to the functions. As one design, the mobile terminal includes a processor and an artificial intelligence (AI) module. The processor and the AI module are configured to be operable with the mobile terminal to perform functions corresponding to the method above. Furthermore, the mobile terminal may include a communication interface. The communication interface is configured to achieve communication between the mobile terminal and other devices. Furthermore, the mobile terminal may include a memory. The memory is configured to be coupled with the processor and the AI module and store program instructions and data necessary for the mobile terminal.

According to a fourth aspect of the disclosure, there is provided a mobile terminal. The terminal includes a processor, an artificial intelligence (AI) module, a memory, a communication interface, and one or more programs. The one or more programs are stored in the memory and are configured to be executed by the processor and the AI module. The programs include instructions for performing steps of any method in the second aspect of the disclosure.

According to a fifth aspect of the disclosure, there is provided a non-volatile computer readable storage medium. The computer readable storage medium is configured to store computer programs for electronic data interchange. The computer programs are operable with a computer to perform all or part of steps described in any method in the second aspect of the disclosure. The computer includes a mobile terminal.

According to a sixth aspect of the disclosure, there is provided a computer program product. The computer program product includes a non-transitory computer-readable storage medium storing computer programs. The computer programs are operable with a computer to perform all or part of steps described in any method in the second aspect of the disclosure. The computer program product can be a software installation package. The computer includes a mobile terminal.

BRIEF DESCRIPTION OF THE DRAWINGS

To describe the technical solutions in the implementations of the present disclosure more clearly, the following briefly introduces the accompanying drawings required for describing the implementations. Apparently, the accompanying drawings in the following description show some implementations of the present disclosure. Those of ordinary skill in the art may also obtain other drawings based on these accompanying drawings without creative efforts.

DETAILED DESCRIPTION

Figure 1A:
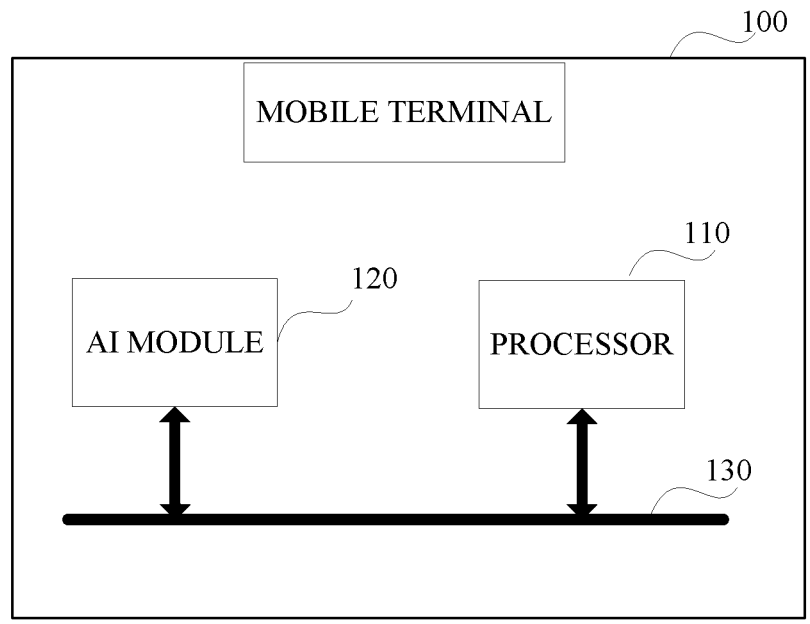
FIG. 1A is a structural schematic diagram illustrating a mobile terminal according to an implementation of the present disclosure.

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", "third", and "fourth" used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The mobile terminal involved in the implementations of the present disclosure may include various handheld devices having wireless communication functions, in-vehicle devices, wearable devices, computing devices or other processing devices connected to the wireless modem, as well as various forms of user equipment (UE), mobile stations (MS), terminal devices, and the like. For the convenience of description, the above-mentioned devices are collectively referred to as a mobile terminal.

Artificial intelligence (AI, also machine intelligence, MI) is intelligence demonstrated by machines, in contrast to the natural intelligence (NI) displayed by humans and other animals. In computer science, AI research is defined as the study of "intelligent agents": any device that perceives its environment and takes actions that maximize its chance of successfully achieving its goals. Colloquially, the term "artificial intelligence" is applied when a machine mimics "cognitive" functions that humans associate with other human minds, such as "learning" and "problem solving".

The processor described in the implementations of the disclosure can be an application processor. An artificial intelligence (AI) module can be in the form of hardware and/or software. When the AI module includes a hardware configuration, the application processor can be integrated with or separated from the AI module. The disclosure is not limited thereto.

When the AI module is integrated with the application processor, if the application processor is a single core processor, the AI module can be an intelligent microprocessing circuit in the application processor. If the application processor is a multi-core processor, the AI module can be a single intelligent microprocessor core in the multi-core processor or an intelligent micro-processing circuit in one of the microprocessor cores.

When the AI module is separated from the application processor, the AI module can be an intelligent microprocessing circuit in any co-processor (such as a baseband processor, a Digital Signal Processing (DSP), a power management chip, etc.) other than the application processor in an application processor platform architecture. Alternatively, the AI module can be a newly-set intelligent microprocessor other than the application processor in the application processor platform architecture. Alternatively, the AI module can be a newly-set intelligent processing platform separated from the application processor platform. The intelligent processing platform at least includes one dedicated intelligent processor and is in communication connection with the application processor platform. As one implementation, the intelligent processing platform can also be in direct communication connection with a memory, peripherals and the like.

According to a first aspect, a mobile terminal is provided. The mobile terminal includes a processor and an artificial intelligence (AI) module coupled with the processor. The processor is configured to detect whether a current user is a registered user when detecting that an application running on the mobile terminal belongs to a preset application set. The processor is further configured to send a monitoring instruction carrying an identification of the application running on the mobile terminal to the AI module when detecting that the current user is the registered user. The AI module is configured to acquire a monitoring strategy of the application running on the mobile terminal which is associated with the registered user; the monitoring strategy comprising a monitoring parameter and a corresponding monitoring parameter threshold. The AI module is further configured to close the application running on the mobile terminal when detecting that a value of the monitoring parameter of the application running on the mobile terminal is greater than or equal to the monitoring parameter threshold.

In one implementation, the mobile terminal further includes a memory. The processor configured to detect whether the current user is the registered user is configured to: obtain biological data of the current user; detect whether the biological data matches a biological template in the memory; determine that the current user is the registered user when detecting that the biological data matches the biological template, or, determine that the current user is not the registered user when detecting that the biological data does not match the biological template.

In one implementation, the biological data includes at least one selected from a group consisting of fingerprint data, facial data, and iris data.

In one implementation, the mobile terminal further includes a fingerprint sensor coupled with the processor and configured to acquire the fingerprint data. In one implementation, the mobile terminal further includes a camera device coupled with the processor and configured to acquire the facial data and/or the iris data.

In one implementation, the AI module is further configured to disable, in a preset period, applications belonging to the application set and of the same type as the application running on the mobile terminal after the AI module closes the application running on the mobile terminal; a duration of the preset period being equal to a disable duration included in the monitoring strategy.

In one implementation, the mobile terminal further includes a camera device. The AI module is further configured to obtain a distance between an upper eyelid and a lower eyelid of the current user via the camera device when detecting that the value of the monitoring parameter of the application running on the mobile terminal is less than the monitoring parameter threshold, and close the application running on the mobile terminal or output a message for prompting the user to rest, when detecting that the distance between the upper eyelid and the lower eyelid of the current user is less than a distance threshold.

In one implementation, the processor is an application processor, the application processor and the AI module are arranged in a general-purpose processor, and the AI module is integrated into or separated from the application processor.

According to a second aspect, an application control method is provided. The method is applicable to a mobile terminal having a processor and an artificial intelligence (AI) module. The method includes: detecting, by the processor, whether a current user is a registered user when detecting that an application running on the mobile terminal belongs to a preset application set; sending, by the processor, a monitoring instruction carrying an identification of the application running on the mobile terminal to the AI module when detecting that the current user is the registered user; acquiring, by the AI module, a monitoring strategy of the application running on the mobile terminal which is associated with the registered user; the monitoring strategy comprising a monitoring parameter and a corresponding monitoring parameter threshold; closing, by the AI module, the application running on the mobile terminal when detecting that a value of the monitoring parameter of the application running on the mobile terminal is greater than or equal to the monitoring parameter threshold.

In one implementation, the mobile terminal further includes a memory. Detecting by the processor whether the current user is a registered user includes: obtaining, by the processor, biological data of the current user; detecting, by the processor, whether the biological data matches a biological template in the memory; determining that the current user is the registered user when detecting that the biological data matches the biological template, or, determining that the current user is not the registered user when detecting that the biological data does not match the biological template of the mobile terminal.

In one implementation, the biological data includes at least one selected from a group consisting of fingerprint data, facial data, and iris data.

In one implementation, obtaining by the processor biological data of the current user includes at least one of: obtaining the fingerprint data by the processor via a fingerprint sensor; obtaining the facial data and the iris data by the processor via a camera device.

In one implementation, acquiring by the AI module the monitoring strategy includes: receiving, by the AI module, the monitoring instruction from the processor; obtaining the identification of the application running on the mobile terminal; and acquiring the monitoring strategy according to the identification.

In one implementation, the method further includes the follows after closing the application running on the mobile terminal: disabling, by the AI module, in a preset period, applications belonging to the application set and of the same type as the application running on the mobile terminal; a duration of the preset period being equal to a disable duration included in the monitoring strategy.

In one implementation, the mobile terminal further includes a camera device, and the method further includes: obtaining, by the AI module, a distance between an upper eyelid and a lower eyelid of the current user via the camera device when detecting that the value of the monitoring parameter of the application running on the mobile terminal is less than the monitoring parameter threshold; outputting, by the AI module, a message for prompting the user to rest or closing the application running on the mobile terminal, when detecting that the distance between the upper eyelid and the lower eyelid of the current user is less than a distance threshold.

According to a third aspect, a non-volatile computer readable storage medium is provided. The non-volatile computer readable storage medium is configured to store one or more programs for electronic data interchange, the one or more programs, when executed, are operable with a computer to: detect whether an application running on the mobile terminal belongs to a preset application set; detect whether a current user is a registered user when detecting that the application running on the mobile terminal belongs to the preset application set; acquire an identification of the application running on the mobile terminal when detecting that the current user is the registered user; acquire a monitoring strategy of the application running on the mobile terminal according to the identification, wherein monitoring strategy includes a monitoring parameter and a corresponding monitoring parameter threshold; close the application running on the mobile terminal when detecting that a value of the monitoring parameter of the application running on the mobile terminal is greater than or equal to the monitoring parameter threshold.

In one implementation, the computer configured to detect whether the current user is the registered user is configured to: obtain biological data of the current user; detect whether the biological data matches a biological template in the memory; determine that the current user is the registered user when detecting that the biological data matches the biological template, or, determine that the current user is not the registered user when detecting that the biological data does not match the biological template of the mobile terminal.

In one implementation, the biological data includes at least one selected from a group consisting of fingerprint data, facial data, and iris data.

In one implementation, the one or more programs, when executed, are further operable with a computer to disable, in a preset period, applications belonging to the application set and of the same type as the application running on the mobile terminal, wherein a duration of the preset period is equal to a disable duration included in the monitoring strategy.

In one implementation, the one or more programs, when executed, are further operable with a computer to obtain a distance between an upper eyelid and a lower eyelid of the current user via a camera device when the value of the monitoring parameter of the application running on the mobile terminal is less than the monitoring parameter threshold, and output a message for prompting the user to rest or close the application running on the mobile terminal, when the distance between the upper eyelid and the lower eyelid of the current user is less than a distance threshold.

A game APP is described here as an example of the running application. The mobile phone provides an active monitoring function of the game APP. After setting this function, guide the user to input a face image through the AI module and sets the game monitoring parameters corresponding to the face image (for example, game application selection (single selection or multiple selections), game duration, Number of times of games, disable duration, etc.). When the game APP is running subsequently, the mobile phone captures the face image of the user by opening a front camera through the AI module, compares corresponding game monitoring parameters, and automatically turns off the game App when detecting that the monitoring parameters of the game APP satisfy the condition such as the monitoring parameter threshold. The mobile terminal will disable the game APP Apply until a predetermined length of time has elapsed.

Implementations of the disclosure will be described hereinafter with reference to the accompanying drawings.

FIG. 1A is a structural schematic diagram illustrating a mobile terminal 100 according to an implementation of the disclosure. The mobile terminal 100 includes a processor 110 and an artificial intelligence (AI) module 120, where the processor 110 is coupled with the AI module 120 via a bus 130.

The processor 110 is configured to detect whether a current user is a registered user when detecting that an application running on the mobile terminal (hereinafter, "running application" for short) belongs to a preset application set.

The processor 110 is further configured to send a monitoring instruction carrying an identification of the running application to the AI module when detecting that the current user is the registered user.

The AI module 120 is configured to acquire a monitoring strategy of the running application, and the monitoring strategy is associated with the registered user, where the monitoring strategy includes a monitoring parameter and a corresponding monitoring parameter threshold. For example, the AI module 120 can receive the monitoring instruction and read out the identification from the monitoring instruction. Then the AI module 120 can find a monitoring strategy according to the identification, that is, find a monitoring strategy corresponding to the identification.

The AI module 120 is further configured to close the running application when detecting that a value of the monitoring parameter of the running application is greater than or equal to the monitoring parameter threshold.

According to this implementation, first, the mobile terminal controls the processor to detect whether the current user is the registered user, when detecting that the running application belongs to the preset application set. Thereafter, when detecting that the current user is the registered user, the mobile terminal controls the processor to send the monitoring instruction carrying the identification of the running application to the AI module. The mobile terminal then controls the AI module to acquire the monitoring strategy of the running application associated with the registered user. Finally, the mobile terminal controls the AI module to close the running application, when detecting that the value of the monitoring parameter of the running application is greater than or equal to the monitoring parameter threshold. Because the application belongs to the preset application set and the monitoring strategy is a registered strategy of the application associated with the registered user, personalized control of a specific user and specific applications can be realized and overuse of the application of the mobile terminal can be avoided, and thereby improving intelligence and security of application control of the mobile terminal.

Figure 1B:
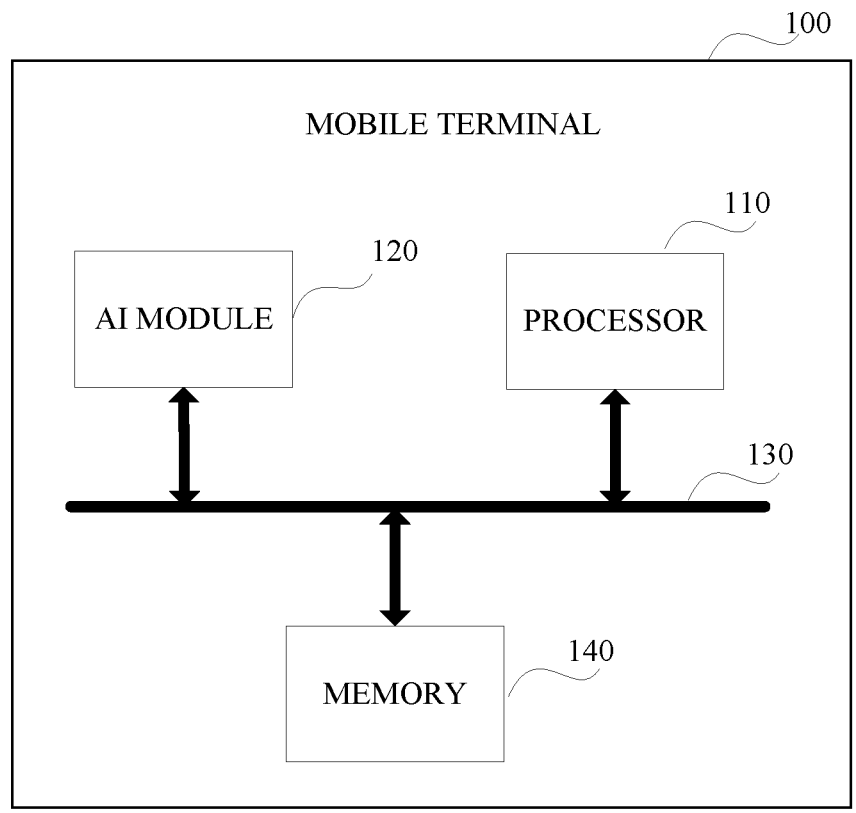
FIG. 1B is a structural schematic diagram illustrating another mobile terminal according to an implementation of the present disclosure.

In at least one implementation, as illustrated in FIG. 1B, the mobile terminal 100 further includes a memory 140. The processor 110 configured to detect whether the current user is the registered user is configured to obtain biological data of the current user, detect whether the biological data matches a biological template in the memory 140, and determine that the current user is the registered user when detecting that the biological data matches the biological template, or determine that the current user is not the registered user when detecting that the biological data does not match the biological template of the mobile terminal.

In the implementation, as the biological data of the user is unique, the accuracy of identity (ID) recognition is high. Therefore, the situation where the application is controlled to be closed due to mistaken recognition of the user's identity can be avoided and the accuracy of application control of the mobile terminal can be improved.

As one implementation, the biological data includes at least one selected from a group consisting of fingerprint data, facial data, and iris data.

Figure 1C:
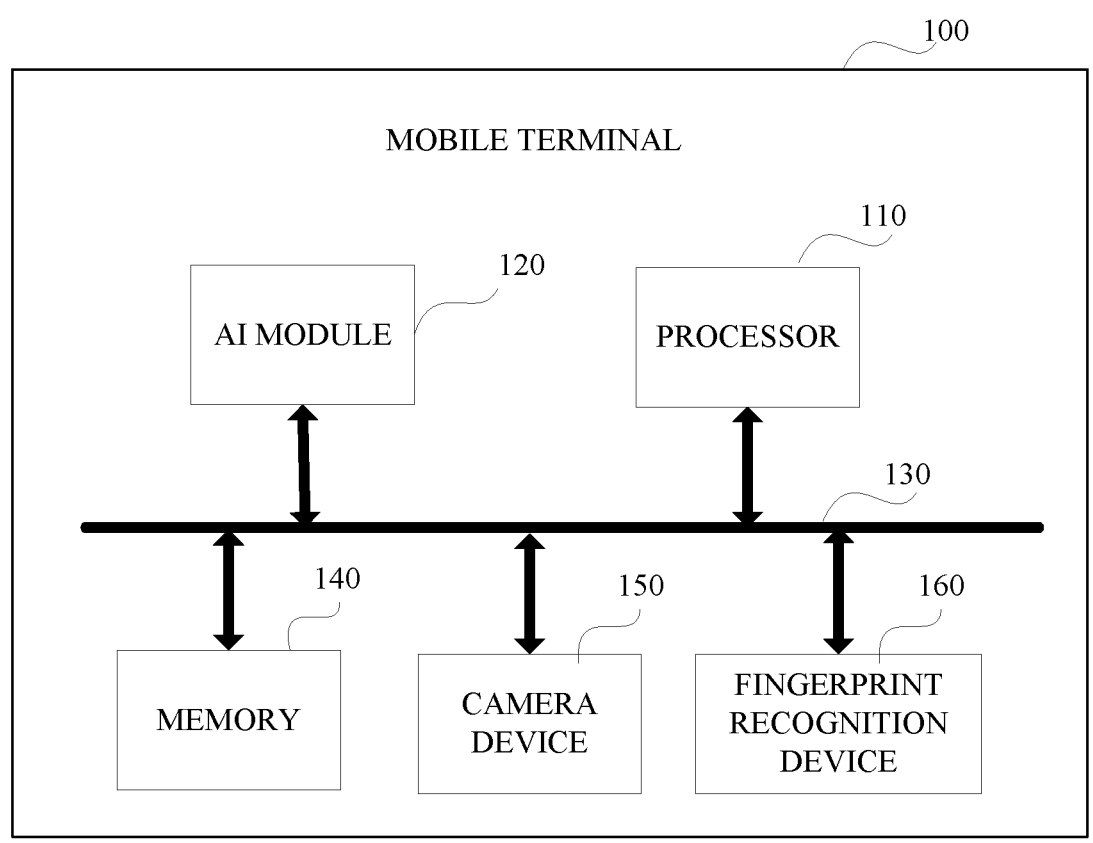
FIG. 1C is a structural schematic diagram illustrating still another mobile terminal according to an implementation of the present disclosure.

As one implementation, as illustrated in FIG. 1C, the mobile terminal 100 further includes a camera device 150, for example, a front-facing camera. The processor 110 configured to obtain the biological data of the current user is configured to obtain the biological data of the current user via the camera device 150.

In this implementation, since the biometric data (the facial data or the iris data) of the user can be acquired by the camera device without any additional interaction with the user or even be acquired imperceptibly (that is, without the user's perception), the recognition process is very convenient and the interaction process is easy, such that the processing efficiency is high, which is beneficial to improving the efficiency and speed of closing the application by the mobile terminal.

As one implementation, as illustrated in FIG. 1C, the mobile terminal 100 further includes a fingerprint recognition device 160, for example, a fingerprint recognition module. The processor 110 configured to obtain the biological data of the current user is configured to obtain the biological data of the current user via the fingerprint recognition device 160.

In this implementation, due to the high accuracy and fast speed of fingerprint recognition, the speed and efficiency of closing the application by the mobile terminal can be improved.

As one implementation, after closing the running application, the AI module 120 is further configured to disable in the application set, in a preset period, applications of the same type as the running application, where a duration of the preset period is equal to a disable duration included in the monitoring strategy.

In this implementation, since in the preset application set, the applications of the same type as the running application can be disabled in a preset period, the user can be prevented from repeatedly opening the applications of the same type in the preset period, thereby forcing the user to rest, such that the intelligence of application control of the mobile terminal can be improved.

As one implementation, the mobile terminal 100 further includes a camera device 150. The AI module 120 is further configured to obtain a distance between an upper eyelid and a lower eyelid of the current user via the camera device 150 when detecting that the value of the monitoring parameter of the running application is less than the monitoring parameter threshold (which may mean that the user is tired). The AI module 120 is further configured to close the running application or output a message for prompting the user to rest when detecting that the distance between the upper eyelid and the lower eyelid of the current user is less than a distance threshold.

In this implementation, the mobile terminal can detect the distance between the upper eyelid and the lower eyelid of the current user via the camera device and output the prompt message or close the application directly when the user is tired, thus improving the security and intelligence of application control of the mobile terminal.

Figure 2:
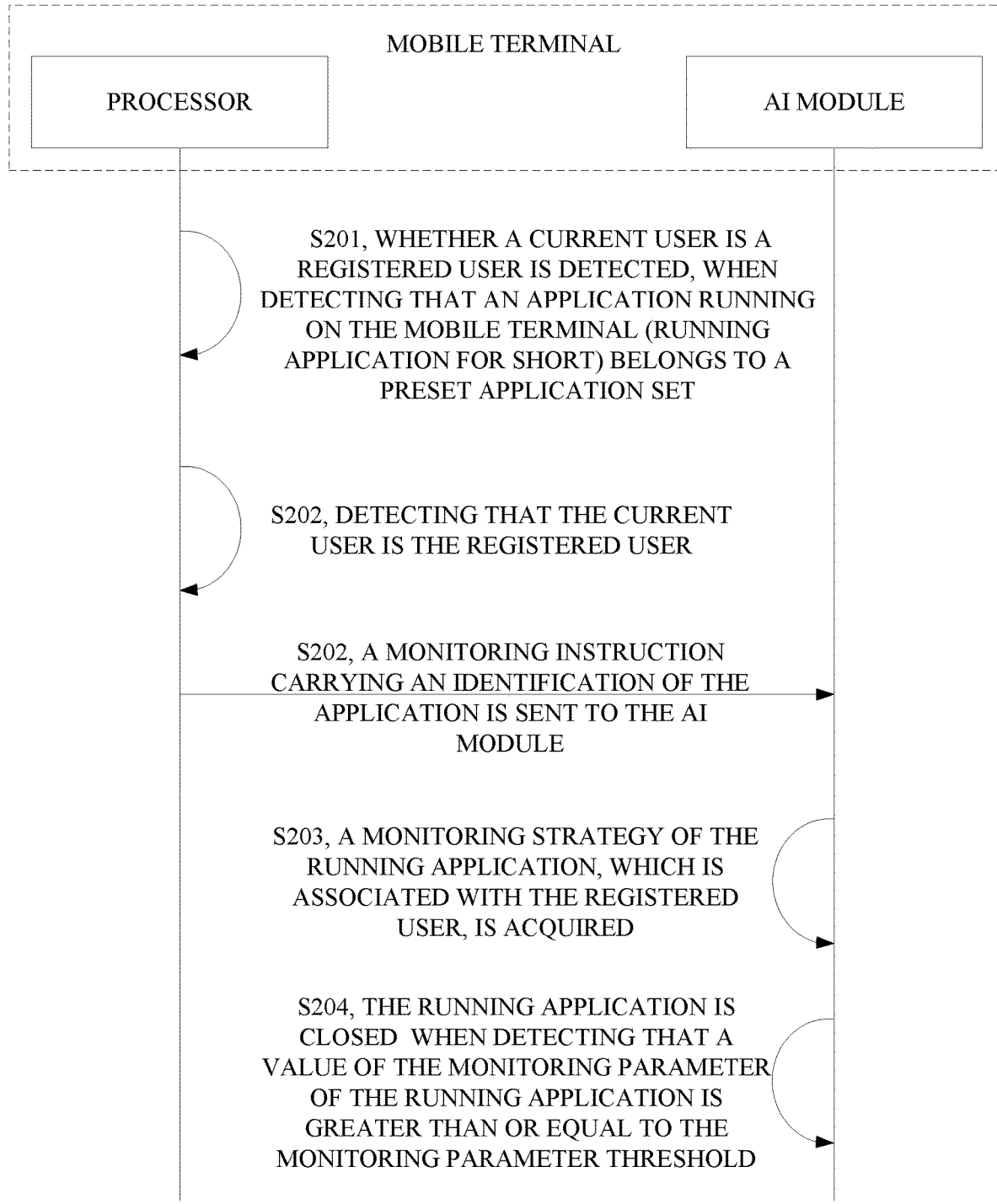
FIG. 2 is a schematic flow chart illustrating an application control method according to an implementation of the present disclosure.

Consistent with the implementation of FIGS. 1A-1C, FIG. 2 is a schematic flow chart illustrating an application control method according to an implementation of the present disclosure. The method is applicable to a mobile terminal including a processor and an artificial intelligence (AI) module coupled with the processor. As illustrated in FIG. 2, the method can begin at S201.

At S201, whether a current user is a registered user is detected by the processor under control of the mobile terminal, when detecting that an application running on the mobile terminal (hereinafter, "running application" for short) belongs to a preset application set.

Applications in the application set include game applications, video applications, chat applications, and other applications frequently used by the user. The applications in the application set can be set by a system or the user. The disclosure is not limited thereto.

When set by the user, for example, the mobile terminal can record application usage history to determine applications of the application set, or the mobile terminal can determine applications of the application set according to setting information of the user.

At S202, a monitoring instruction carrying an identification of the application is sent to the AI module by the processor under control of the mobile terminal when detecting that the current user is the registered user.

At S203, a monitoring strategy of the running application, which is associated with the registered user, is acquired by the AI module under control of the mobile terminal, where the monitoring strategy includes a monitoring parameter and a corresponding monitoring parameter threshold. For example, the AI module can receive the monitoring instruction and read out the identification from the monitoring instruction. Then the AI module 120 can find a monitoring strategy according to the identification, that is, find a monitoring strategy corresponding to the identification.

At S204, the running application is closed by the AI module under control of the mobile terminal when detecting that a value of the monitoring parameter of the running application is greater than or equal to the monitoring parameter threshold. With regard to the value of the monitoring parameter, it can be monitored or detected by the mobile terminal (such as by the AI module, or a system) in real time or at intervals. For example, the AI module can start to detect the value of the monitoring parameter in response to the monitoring instruction received from the processor.

According to the implementation of the disclosure, when detecting that the running application belongs to the preset application set, whether the current user is the registered user is detected by the processor under control of the mobile terminal. After that, when detecting that the current user is the registered user, the monitoring instruction carrying the identification of the application is sent to the AI module by the processor under control of the mobile terminal. Thereafter, the monitoring strategy of the running application associated with the registered user is acquired by the AI module under control of the mobile terminal. At last, when detecting that the value of the monitoring parameter of the running application is greater than or equal to the monitoring parameter threshold, the running application is closed by the AI module under control of the mobile terminal. As the application belongs to the preset application set and the monitoring strategy is a registered strategy of the application associated with the registered user, personalized control of a specific user and specific applications can be realized, overuse of the application of the mobile terminal can be avoided, thereby improving intelligence and security of application control of the mobile terminal.

As one implementation, the mobile terminal further includes a memory. Whether a current user is a registered user can be detected at S201 as follows.

Biological data of the current user is obtained by the processor under control of the mobile terminal. Whether the biological data matches a biological template in the memory is detected by the processor under control of the mobile terminal. Determine that the current user is the registered user when detecting that the biological data matches the biological template. On the other hand, determine that the current user is not the registered user when detecting that the biological data does not match the biological template of the mobile terminal.

In the implementation, since the biological data of the user is unique, the accuracy of identity recognition is high. Therefore, it is possible to avoid the situation that the application is controlled to be closed due to the mistaken recognition of the user's identity and help to improve the accuracy of application control of the mobile terminal.

As one implementation, the biological data includes at least one selected from a group consisting of fingerprint data, facial data, and iris data. The fingerprint data can be obtained via a fingerprint sensor or fingerprint module, the facial data or the iris data can be obtained via a camera.

For example, the biological data is the fingerprint data and the biological template is a fingerprint template. The fingerprint template can be a fingerprint data template or a fingerprint image template. The fingerprint data template refers to a set of corresponding relationships between locations of feature minutiae and feature values (capacitance, inductance, voltage, current, relative value, etc.) of feature minutiae of a fingerprint surface of a finger of the registered user. The fingerprint image template refers to an image of the fingerprint surface of the finger of the registered user. The fingerprint data matches the fingerprint data template means that in the fingerprint data, the number of feature points that correspond to feature points in the fingerprint data template is equal to or greater than a preset threshold.

As another example, the biological data is the facial data and the biological template is a facial template. The facial template can be a facial data template or a facial image template. The facial data template refers to a set of corresponding relationships between locations of feature minutiae and feature values (capacitance, inductance, voltage, current, relative value, etc.) of feature minutiae of a face of the registered user. The facial image template refers to an image of the face of the registered user.

As still another example, the biological data is the iris data and the biological template is an iris template. The iris template can be an iris data template or an iris image template. The iris data template refers to a set of corresponding relationships between locations of feature minutiae and feature values (capacitance, inductance, voltage, current, relative value, etc.) of feature minutiae of an iris of the registered user. The iris image template refers to an image of the iris of the registered user.

As one implementation, the mobile terminal further includes a camera device, for example, a front camera. In this case, the biological data of the current user can be obtained via the camera device.

In this implementation, as additional interactions with the user can be omitted when obtaining the biometric data (the facial data or the iris data) of the user via the camera device or the biometric data can even be acquired imperceptibly (that is, without the user's perception), the recognition process is very convenient and as a result, the interaction process is easy and the processing efficiency is high, thereby improving the efficiency and speed of closing the application by the mobile terminal.

As one implementation, the mobile terminal further includes a fingerprint recognition device, for example, a fingerprint recognition module. In this case, the biological data of the current user can be obtained via the fingerprint recognition device.

In this implementation, since the high accuracy and fast speed of fingerprint recognition, it is possible to help to improve the speed and efficiency of closing the application by the mobile terminal.

As one implementation, after the running application is closed by the AI module under control of the mobile terminal, the method further includes the following operation.

In the application set, applications of the same type as the running application are disabled in a preset period by the AI module under control of the mobile terminal, where a duration of the preset period is equal to a disable duration included in the monitoring strategy.

In this implementation, since in the applications set, applications of the same type as the running application can be disabled in a preset period, the user can be prevented from repeatedly opening the applications of the same type in the preset period, so as to force the user to rest, therefore improving the intelligence of application control of the mobile terminal.

As one implementation, the mobile terminal further includes a camera device. Based on this, the method further includes the following operations.

A distance between an upper eyelid and a lower eyelid of the current user is obtained by the AI module under control of the mobile terminal via the camera device when detecting that the value of the monitoring parameter of the running application is less than the monitoring parameter threshold.

A message for prompting the user to rest is output or the running application is closed by the AI module under control of the mobile terminal when detecting that the distance between the upper eyelid and the lower eyelid of the current user is less than a distance threshold.

In this implementation, the distance between the upper eyelid and the lower eyelid of the current user can be detected under control of the mobile terminal via the camera device and the prompt message can be output or the application can be directly closed when the user is tired, hence improving the security and intelligence of application control of the mobile terminal.

Figure 3:
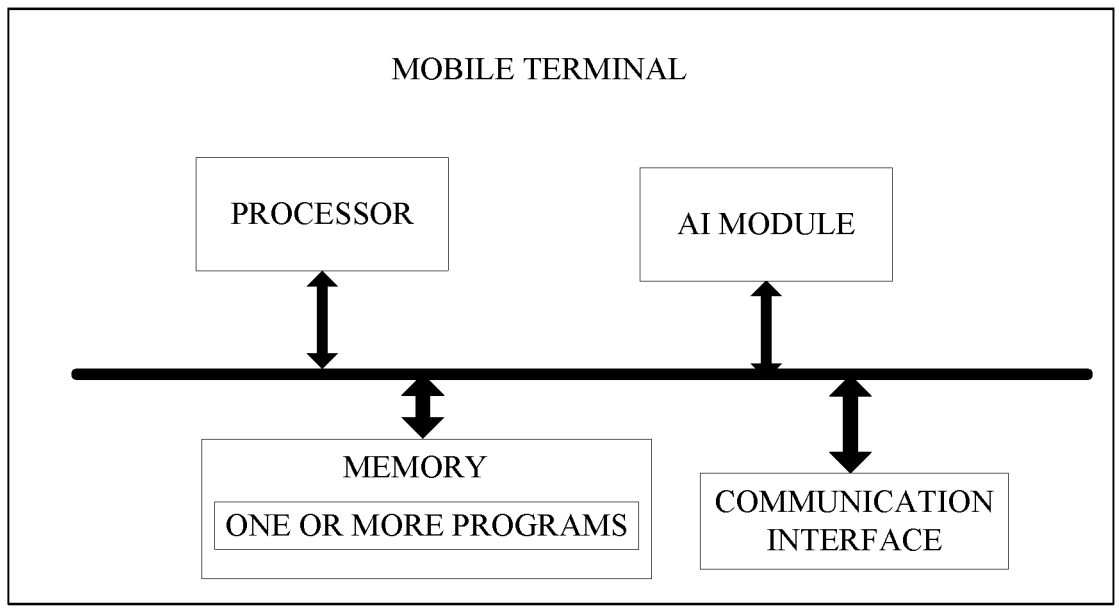
FIG. 3 is a structural schematic diagram illustrating a mobile terminal according to an implementation of the present disclosure.

Consistent with the implementation of FIG. 2, FIG. 3 is a structural schematic diagram illustrating a mobile terminal according to an implementation of the present disclosure. As illustrated in FIG. 3, the mobile terminal includes a processor, an artificial intelligence (AI) module, a memory, a communication interface, and one or more programs. The one or more programs are stored in the memory and are configured to be executed by the processor. The programs include instructions for performing the following operations.

Whether a current user is a registered user is detected by the processor under control of the mobile terminal when detecting that an application running on the mobile terminal (hereinafter, "running application" for short) belongs to a preset application set.

A monitoring instruction carrying an identification of the application is sent to the AI module by the processor under control of the mobile terminal when detecting that the current user is the registered user.

A monitoring strategy of the running application associated with the registered user is acquired by the AI module under control of the mobile terminal, where the monitoring strategy includes a monitoring parameter and a corresponding monitoring parameter threshold.

The running application is closed by the AI module under control of the mobile terminal when detecting that a value of the monitoring parameter of the running application is greater than or equal to the monitoring parameter threshold.

According to the implementation of the disclosure, when detecting that the running application belongs to the preset application set, the processor detects whether the current user is the registered user under control of the mobile terminal. And then, when detecting that the current user is the registered user, the processor sends the monitoring instruction carrying the identification of the application to the AI module under control of the mobile terminal. After that, the AI module acquires the monitoring strategy of the running application associated with the registered user under control of the mobile terminal. Last, when detecting that the value of the monitoring parameter of the running application is greater than or equal to the monitoring parameter threshold, the AI module closes the running application under control of the mobile terminal. As the application belongs to the preset application set and the monitoring strategy is a registered strategy of the application associated with the registered user, it is possible to realize personalized control of a specific user and specific applications and avoid overuse of the application of the mobile terminal, and therefore improving intelligence and security of application control of the mobile terminal.

As one implementation, the mobile terminal further includes a memory. The instructions for performing the detecting whether a current user is a registered user are configured to perform the following operations. Biological data of the current user is obtained by the processor under control of the mobile terminal. Whether the biological data matches a biological template in the memory is detected by the processor under control of the mobile terminal. Determine that the current user is the registered user when detecting that the biological data matches the biological template. On the other hand, determine that the current user is not the registered user when detecting that the biological data does not match the biological template of the mobile terminal.

As one implementation, the biological data includes one selected from a group consisting of fingerprint data, facial data, and iris data.

The programs further include instructions for performing the following operations. After the running application is closed by the AI module under control of the mobile terminal, in the application set, applications of the same type as the running application are disabled in a preset period by the AI module under control of the mobile terminal, where a duration of the preset period is equal to a disable duration included in the monitoring strategy.

As one implementation, the mobile terminal further includes a camera device. Based on this, the programs further include instructions for performing the following operations. A distance between an upper eyelid and a lower eyelid of the current user is obtained by the AI module under control of the mobile terminal via the camera device when detecting that the value of the monitoring parameter of the running application is less than the monitoring parameter threshold. A message for prompting the user to rest is output or the running application is closed by the AI module under control of the mobile terminal when detecting that the distance between the upper eyelid and the lower eyelid of the current user is less than a distance threshold.

The foregoing technical solutions of the implementations of the disclosure are mainly described from the viewpoint of execution of the method. It can be understood that, in order to implement the above functions, the mobile terminal includes hardware structures and/or software modules corresponding to the respective functions. Those skilled in the art should readily recognize that, in combination with the exemplary units and scheme steps or operations described in the implementations disclosed herein, the present disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the mobile terminal in accordance with the foregoing method examples. For example, functional units may be divided according to corresponding functions, and two or more functions may be integrated into one processing unit. The above-mentioned integrated unit can be implemented in the form of hardware or software functional units. It should be noted that the division of units in the implementations of the present disclosure is schematic and is merely a logical function division; there may be other division manners in actual implementation.

Figure 4:
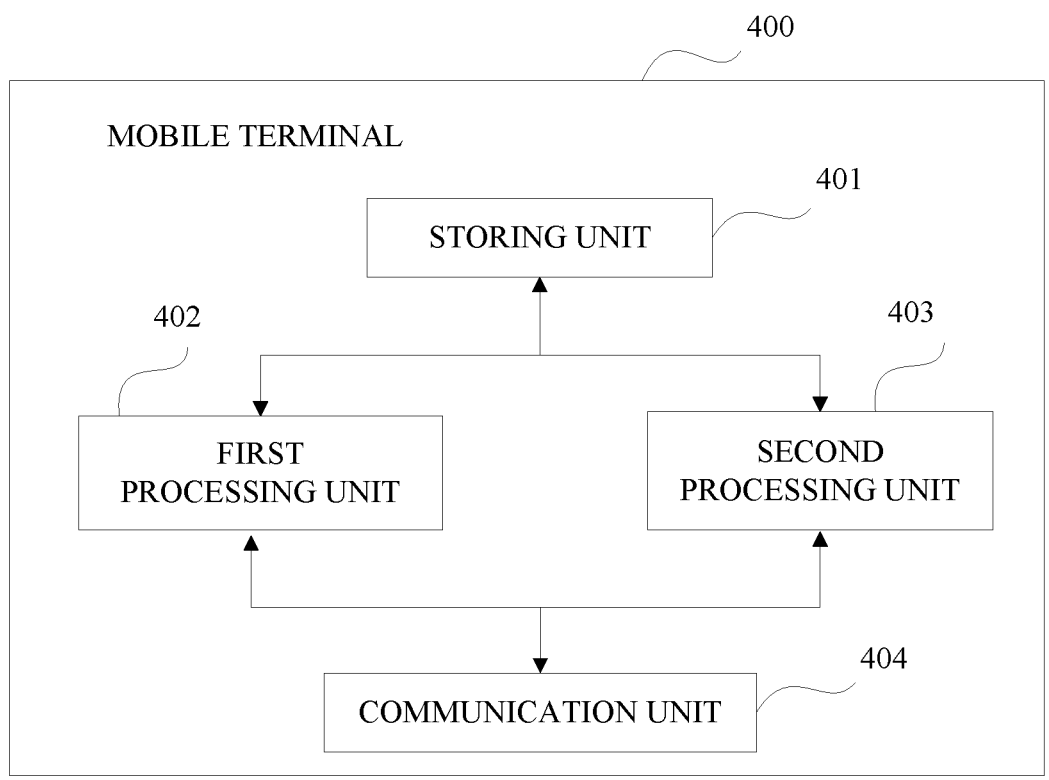
FIG. 4 is a block diagram illustrating functional units of a mobile terminal according to an implementation of the present disclosure.

In the case of integrated units, FIG. 4 is a block diagram illustrating functional units of a mobile terminal according to an implementation of the present disclosure. The mobile terminal 400 includes a first processing unit 402, a second processing unit 403, and a communication unit 404. The first processing unit 402 and the second processing unit 403 are configured to control and manage operations of the mobile terminal, for example, the first processing unit 402 is configured to be operable with the mobile terminal to perform operations at S201-S204 in FIG. 2 and/or other processes of technologies described herein. The communication unit 404 is configured to achieve communication between the mobile terminal and other communication devices or between the first processing unit 402 or the second processing unit 403 and peripherals (a camera device, a fingerprint recognition device etc.) of the mobile terminal. The mobile terminal can further include a storing unit 401. The storing unit 401 is configured to store program instructions and data necessary for the mobile terminal.

The first processing unit 402 is configured to detect whether a current user is a registered user when detecting that an application running on the mobile terminal (hereinafter, "running application" for short) belongs to a preset application set and send a monitoring instruction carrying an identification of the application to the second processing unit 403 when detecting that the current user is the registered user.

The second processing unit 403 is configured to: acquire a monitoring strategy of the running application associated with the registered user via the communication unit, where the monitoring strategy includes a monitoring parameter and a corresponding monitoring parameter threshold; close the running application when detecting that a value of the monitoring parameter of the running application is greater than or equal to the monitoring parameter threshold.

As one implementation, the mobile terminal further includes a memory. The first processing unit 402 configured to detect whether the current user is the registered user is configured to: control the processor to obtain biological data of the current user; control the processor to detect whether the biological data matches a biological template in the memory; determine that the current user is the registered user when detecting that the biological data matches the biological template, or determine that the current user is not the registered user when detecting that the biological data does not match the biological template of the mobile terminal.

As one implementation, the biological data includes one selected from a group consisting of fingerprint data, facial data, and iris data.

As one implementation, after the second processing unit 403 closes the running application, the second processing unit 403 is further configured to disable, in a preset period, applications belonging to the application set and of the same type as the running application, where a duration of the preset period is equal to a disable duration included in the monitoring strategy.

As one implementation, the mobile terminal further includes a camera device. The second processing unit 403 is further configured to obtain a distance between an upper eyelid and a lower eyelid of the current user via the camera device when detecting that the value of the monitoring parameter of the running application is less than the monitoring parameter threshold and close the running application or output a message for prompting the user to rest when detecting that the distance between the upper eyelid and the lower eyelid of the current user is less than a distance threshold.

The first processing unit 402 can be an artificial intelligence (AI) module. The second processing unit 403 can be a processor or a controller. The AI module and the processor may be, for example, a central processing unit (CPU), a general-purpose processor, a digital signal processor (DSP), an application specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor and the AI module described above may also be a combination of computing functions, for example, a combination of one or more microprocessors, a combination of the DSP and the microprocessor, and the like. The communication unit 404 may be a transceiver, a transceiver circuit, an internal communication interface (a communication port between a processor and a peripheral), and the like. The storing unit 401 may be a memory.

Another mobile terminal is also provided in the disclosure. The mobile terminal includes a general-purpose processor. The general-purpose processor is configured to: detect whether a current user is a registered user when detecting that an application running on the mobile terminal (hereinafter, "running application" for short) belongs to a preset application set; generate a monitoring instruction carrying an identification of the application when detecting that the current user is the registered user; acquire a monitoring strategy of the running application associated with the registered user, where the monitoring strategy includes a monitoring parameter and a corresponding monitoring parameter threshold; close the running application when detecting that a value of the monitoring parameter of the running application is greater than or equal to the monitoring parameter threshold.

The general-purpose processor can be a processing chip with data processing capability.

In the implementation, because the application belongs to the preset application set and the monitoring strategy is a registered strategy of the application associated with the registered user, personalized control of a specific user and specific applications can be realized and overuse of applications of the mobile terminal can be avoided, thereby improving intelligence and security of application control of the mobile terminal.

In at least one implementation, the mobile terminal further includes a memory. The general-purpose processor configured to detect whether the current user is the registered user is configured to: obtain biological data of the current user, detect whether the biological data matches a biological template in the memory, and determine that the current user is the registered user when detecting that the biological data matches the biological template, or determine that the current user is not the registered user when detecting that the biological data does not match the biological template of the mobile terminal.

As one implementation, the biological data includes one selected from a group consisting of fingerprint data, facial data, and iris data.

As one implementation, after the general-purpose processor closes the running application, the general-purpose processor is further configured to disable, in a preset period, applications belonging to the application set and of the same type as the running application, where a duration of the preset period is equal to a disable duration included in the monitoring strategy.

As one implementation, the mobile terminal further includes a camera device. The general-purpose processor is further configured to obtain a distance between an upper eyelid and a lower eyelid of the current user via the camera device when detecting that the value of the monitoring parameter of the running application is less than the monitoring parameter threshold and close the running application or output a message for prompting the user to rest when detecting that the distance between the upper eyelid and the lower eyelid of the current user is less than a distance threshold.

As one implementation, the general-purpose processor includes an application processor and an artificial intelligence (AI) module. The AI module is integrated in the application processor and configured to execute any step that the general-purpose processor is operable to execute.

As one implementation, the general-purpose processor includes an application processor and an artificial intelligence (AI) module. The AI module is separated from the application processor and configured to execute any step that the general-purpose processor is operable to execute.

Figure 5:
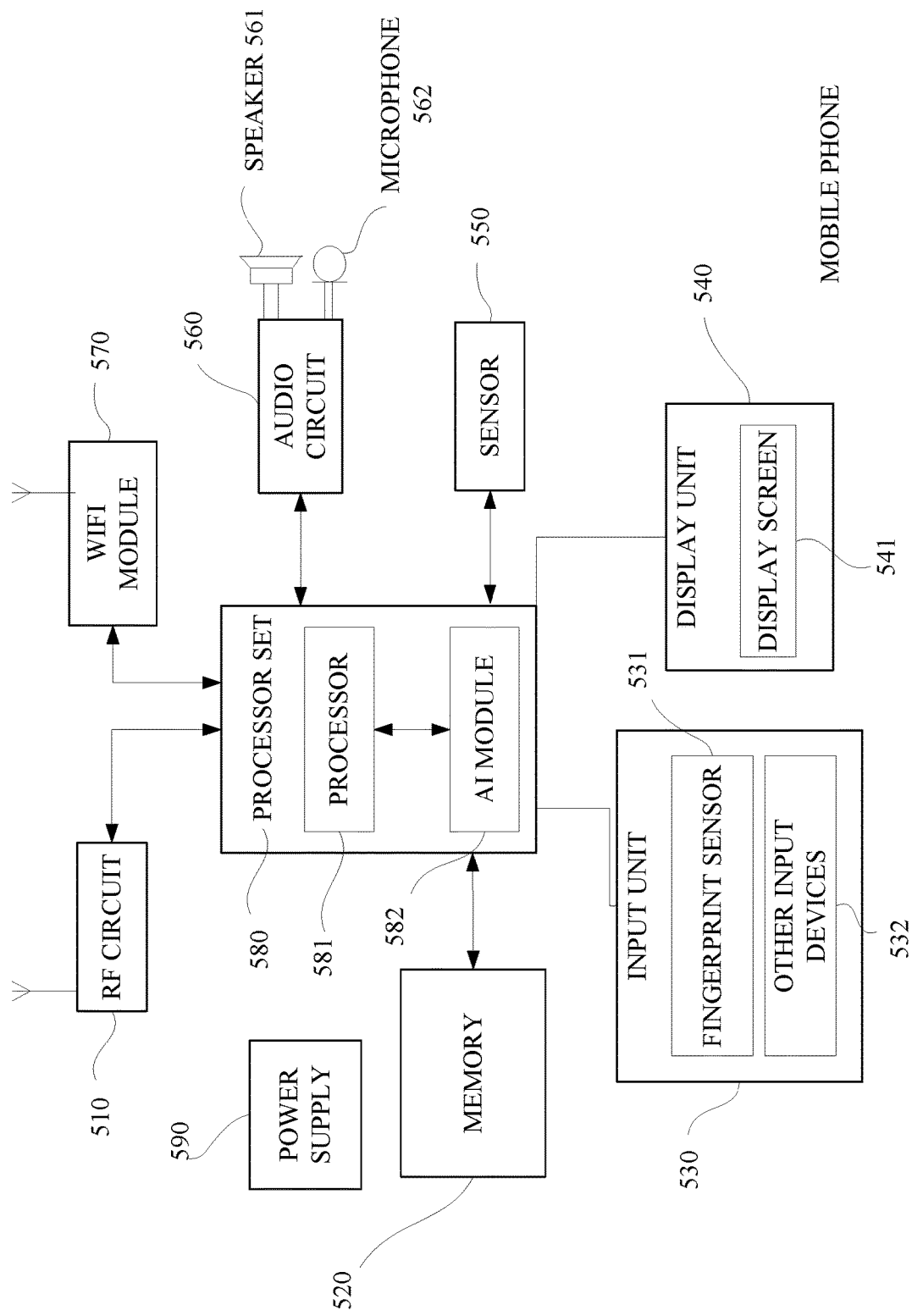
FIG. 5 is a structural schematic diagram illustrating another mobile terminal according to an implementation of the present disclosure.

An implementation of the present disclosure further provides another mobile terminal. As illustrated in FIG. 5, only parts related to the implementations of the present disclosure are illustrated for ease of description. For technical details not described, reference may be made to the method implementations of the present disclosure. The mobile terminal may be any terminal device, such as a mobile phone, a tablet computer, a personal digital assistant (PDA), a point of sale terminal (POS), an on-board computer and the like. The following describes the mobile phone as an example of the mobile terminal.

FIG. 5 is a block diagram of a part of a structure of a mobile phone related to a mobile terminal according to an implementation of the present disclosure. As illustrated in FIG. 5, the mobile phone includes an RF (radio frequency) circuit 510, a memory 520, an input unit 530, a display unit 540, a sensor 550, an audio circuit 560, a Wi-Fi (wireless fidelity) module 570, a processor set 580, a power supply 590 and other components. Those skilled in the art can understand that the structure of the mobile phone illustrated in FIG. 5 does not constitute any limitation on a mobile phone. The mobile phone configured to implement technical solutions of the disclosure may include more or fewer components than illustrated or may combine certain components or different components.

In the following, various components of the mobile phone will be described in detail with reference to FIG. 5.

The processor set 580 is a control center of the mobile phone and includes a processor 581 and an artificial intelligence (AI) module 582 coupled with the processor 581. The processor 581 and the AI module 582 connect various parts of the entire mobile phone through various interfaces and lines. By running or executing software programs and/or modules stored in the memory 520 and calling data stored in the memory 520, the processor 581 and the AI module 582 can execute various functions of the mobile phone and conduct data processing, so as to monitor the mobile phone as a whole. The processor 581 and the AI module 582 are configured to execute the following operations.

The processor 581 detects whether a current user is a registered user when detecting that an application running on the mobile terminal (running application for short) belongs to a preset application set. The processor 581 sends a monitoring instruction carrying an identification of the application to the AI module 582 when detecting that the current user is the registered user. The AI module 582 acquires a monitoring strategy of the running application associated with the registered user, where the monitoring strategy includes a monitoring parameter and a corresponding monitoring parameter threshold. The AI module 582 closes the running application when detecting that a value of the monitoring parameter of the running application is greater than or equal to the monitoring parameter threshold.

As one implementation, the processor 581 and the AI module 582 may include one or more processing units. The processor 581 may be integrated with an application processor and a modem processor, where the application processor is mainly configured to handle an operating system, a user interface, applications, and the like, and the modem processor is mainly configured to deal with wireless communication. It is understandable that the modem processor mentioned above may not be integrated into the processor 581.

The RF circuit 510 is configured to transmit or receive information. Generally, the RF circuit 510 includes but is not limited to an antenna, at least one amplifier, a transceiver, a coupler, a low noise amplifier (LNA), a duplexer, and the like. In addition, the RF circuit 510 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 520 is configured to store software programs and modules, and the processor 581 and the AI module are configured to execute various function applications and data processing of the mobile phone by running the software programs and the modules stored in the memory 520. The memory 520 mainly includes a program storage area and a data storage area. The program storage area may store an operating system, application programs required for at least one function and so on. The data storage area may store data (such as usage parameters of an application) created according to use of the mobile phone, and so on. In addition, the memory 520 may include a high-speed RAM, and may further include a non-volatile memory such as at least one disk storage device, a flash device, or other non-volatile solid storage devices.

The input unit 530 may be configured to receive input digital or character information and generate key signal input associated with user setting and function control of the mobile phone. As one implementation, the input unit 530 may include a fingerprint sensor 531 and other input devices 532. The fingerprint sensor 531 can collect fingerprint data of the user. In addition to the fingerprint sensor 531, the input unit 530 may further include other input devices 532. As one implementation, the other input devices 532 may include, but not limited to, one or more of a touch screen, a physical key, a function key (such as a volume control key, a switch key, etc.), a trackball, a mouse, a joystick and the like.

The display unit 540 is configured to display information input by the user or information provided for the user or various menus of the mobile phone. The display unit 540 may include a display screen 541, and alternatively, the display screen 541 may be in the form of a liquid crystal display (LCD), an organic light-emitting diode (OLED) and so on. Although the fingerprint sensor 531 and the display screen 541 are illustrated as two separate components in FIG. 5 to realize the input and output functions of the mobile phone, in some implementations, the fingerprint sensor 531 may be integrated with the display screen 541 to implement the input and output functions of the mobile phone.

The mobile phone may also include at least one sensor 550, such as a light sensor, a motion sensor, and other sensors. As one implementation, the light sensor may include an ambient light sensor and a proximity sensor, among which the ambient light sensor may adjust the brightness of the display screen 541 according to ambient lights, and the proximity sensor may turn off the display screen 541 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and infrared sensor and other sensors, and it will not be repeated herein.

The audio circuit 560, the speaker 561, the microphone 562 may provide an audio interface between the user and the mobile phone. The audio circuit 560 may convert the received audio data into electrical signals and transfer the electrical signals to the speaker 561; thereafter the speaker 561 converts the electrical signals into sound signals to output. On the other hand, the microphone 562 converts the received sound signals into electrical signals, which will be received and converted into audio data by the audio circuit 560 to output. The audio data is then processed and transmitted by the processor 581 via an RF circuit 510 to another mobile phone for example, or, the audio data is output to the memory 520 for further processing.

Wi-Fi belongs to a short-range wireless transmission technology. With aid of the Wi-Fi module 570, the mobile phone may assist the user in E-mail receiving and sending, webpage browsing, access to streaming medium and the like. Wi-Fi provides users with wireless broadband Internet access. Although the Wi-Fi module 570 is illustrated in FIG. 5, the Wi-Fi module 570 is not essential to the mobile phone and can be omitted according to actual needs without departing from the essential nature of the present disclosure.

The mobile phone also includes a power supply 590 (e.g., a battery) that supplies power to various components. For instance, the power supply 590 may be logically connected to the processor set 580 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 2 can be realized based on the structure of the mobile phone.

The functions of the units illustrated in FIG. 4 can be achieved based on the structure of the mobile phone.

Implementations of the present disclosure also provide a computer readable storage medium. The computer readable storage medium stores a computer program for electronic data interchange which, when executed, is operable with a computer to accomplish all or part of the operations of any of the methods described in the above-described method implementation. The computer can be a mobile terminal or other equipment.

Implementations of the present disclosure also provide a computer program product. The computer program product includes a non-transitory computer readable storage medium storing computer programs. The computer programs are operable with a computer to perform all or part of the operations of any of the methods described in the above method implementations. The computer program product may be a software installation package. The computer can be a mobile terminal or other equipment.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A mobile terminal, comprising:
   a processor configured to:
      detect whether a current user is a registered user when detecting that an application running on the mobile terminal belongs to a preset application set; and
      send a monitoring instruction carrying an identification of the application running on the mobile terminal to an artificial intelligence (AI) module when detecting that the current user is the registered user; and
   the AI module coupled with the processor, the AI module configured to:
      acquire, in response to the monitoring instruction, a monitoring strategy of the application running on the mobile terminal which is associated with the registered user;
   the monitoring strategy comprising a monitoring parameter and a corresponding monitoring parameter threshold; and
      close the application running on the mobile terminal when detecting that a value of the monitoring parameter of the application running on the mobile terminal is greater than or equal to the corresponding monitoring parameter threshold;
   wherein the mobile terminal further comprises a memory, and the processor configured to detect whether the current user is the registered user is further configured to:
      obtain biological data of the current user;
      detect whether the biological data matches a biological template in the memory;
      determine that the current user is the registered user when detecting that the biological data matches the biological template; and
      determine that the current user is not the registered user when detecting that the biological data does not match the biological template.

2. The mobile terminal of claim 1, wherein the biological data comprises at least one data selected from a group consisting of fingerprint data, facial data, and iris data.

3. The mobile terminal of claim 2, wherein the mobile terminal further comprises a fingerprint sensor coupled with the processor and configured to acquire the fingerprint data.

4. The mobile terminal of claim 2, the mobile terminal further comprises a camera device coupled with the processor and configured to acquire at least one of the facial data and the iris data.

5. The mobile terminal of claim 1, wherein the AI module is further configured to disable, in a preset period, applications belonging to the preset application set and being of the same type as the application running on the mobile terminal, after the AI module closes the application running on the mobile terminal; and a duration of the preset period is equal to a disable duration comprised in the monitoring strategy.

6. The mobile terminal of claim 1, wherein the mobile terminal further comprises a camera device, and the AI module is further configured to:
   obtain a distance between an upper eyelid and a lower eyelid of the current user via the camera device when detecting that the value of the monitoring parameter of the application running on the mobile terminal is less than the corresponding monitoring parameter threshold; and
   close the application running on the mobile terminal or output a message for prompting the current user to rest, when detecting that the distance between the upper eyelid and the lower eyelid of the current user is less than a distance threshold.

7. The mobile terminal of claim 1, wherein the processor is an application processor, the application processor and the AI module are configured in a general-purpose processor, and the AI module is integrated into or separated from the application processor.

8. A method of application control for a mobile terminal comprising a processor and an artificial intelligence (AI) module, the method comprising:
   detecting, by the processor, whether a current user is a registered user when detecting that an application running on the mobile terminal belongs to a preset application set;
   sending, by the processor, a monitoring instruction carrying an identification of the application running on the mobile terminal to the AI module when detecting that the current user is the registered user;
   acquiring, by the AI module, a monitoring strategy of the application running on the mobile terminal which is associated with the registered user; the monitoring strategy comprising a monitoring parameter and a corresponding monitoring parameter threshold;
   closing, by the AI module, the application running on the mobile terminal when detecting that a value of the monitoring parameter of the application running on the mobile terminal is greater than or equal to the corresponding monitoring parameter threshold; and
   disabling, by the AI module, in a preset period, applications belonging to the preset application set and being of the same type as the application running on the mobile terminal, wherein a duration of the preset period is equal to a disable duration comprised in the monitoring strategy.

9. The method of claim 8, wherein the mobile terminal further comprises a memory, and the detecting by the processor whether the current user is the registered user comprises:
   obtaining, by the processor, biological data of the current user;
   detecting, by the processor, whether the biological data matches a biological template in the memory;
   determining that the current user is the registered user when detecting that the biological data matches the biological template; and
   determining that the current user is not the registered user when detecting that the biological data does not match the biological template of the mobile terminal.

10. The method of claim 9, wherein the biological data comprises at least one data selected from a group consisting of fingerprint data, facial data, and iris data.

11. The method of claim 10, wherein the obtaining, by the processor, the biological data of the current user comprises at least one of:
   obtaining the fingerprint data by the processor via a fingerprint sensor; and
   obtaining the facial data and the iris data by the processor via a camera device.

12. The method of claim 8, wherein the acquiring, by the AI module, the monitoring strategy comprises:
   receiving, by the AI module, the monitoring instruction from the processor;
   in response to the monitoring instruction, obtaining the identification of the application running on the mobile terminal; and
   acquiring the monitoring strategy according to the identification.

13. The method of claim 8, wherein the mobile terminal further comprises a camera device, and the method further comprises:
   obtaining, by the AI module, a distance between an upper eyelid and a lower eyelid of the current user via the camera device when detecting that the value of the monitoring parameter of the application running on the mobile terminal is less than the corresponding monitoring parameter threshold; and
   outputting, by the AI module, a message for prompting the current user to rest or closing the application running on the mobile terminal, when detecting that the distance between the upper eyelid and the lower eyelid of the current user is less than a distance threshold.

14. A non-transitory computer readable storage medium configured to store one or more programs for electronic data interchange, the one or more programs, when executed, being operable with a computer to:
   detect whether an application running on a mobile terminal belongs to a preset application set;
   detect whether a current user is a registered user when detecting that the application running on the mobile terminal belongs to the preset application set;
   acquire an identification of the application running on the mobile terminal when detecting that the current user is the registered user;
   acquire a monitoring strategy of the application running on the mobile terminal according to the identification, wherein monitoring strategy comprises a monitoring parameter and a corresponding monitoring parameter threshold;
   close the application running on the mobile terminal when detecting that a value of the monitoring parameter of the application running on the mobile terminal is greater than or equal to the corresponding monitoring parameter threshold;
   obtain a distance between an upper eyelid and a lower eyelid of the current user via a camera device when the value of the monitoring parameter of the application running on the mobile terminal is less than the corresponding monitoring parameter threshold; and
   output a message for prompting the current user to rest or close the application running on the mobile terminal, when the distance between the upper eyelid and the lower eyelid of the current user is less than a distance threshold.

15. The non-transitory computer readable storage medium of claim 14, wherein the computer configured to detect whether the current user is the registered user is configured to:
   obtain biological data of the current user;
   detect whether the biological data matches a biological template in a memory;

determine that the current user is the registered user when detecting that the biological data matches the biological template; and determine that the current user is not the registered user when detecting that the biological data does not match the biological template of the mobile terminal.

16. The non-transitory computer readable storage medium of claim 15, wherein the biological data comprises at least one selected from a group consisting of fingerprint data, facial data, and iris data.

17. The non-transitory computer readable storage medium of claim 14, wherein the one or more programs, when executed, are further operable with the computer to:

disable, in a preset period, applications belonging to the preset application set and of the same type as the application running on the mobile terminal, wherein a duration of the preset period is equal to a disable duration comprised in the monitoring strategy.

* * * * *